Nov. 18, 1941.  H. G. ALLEN  2,262,828
FISH LURE
Filed Nov. 5, 1940
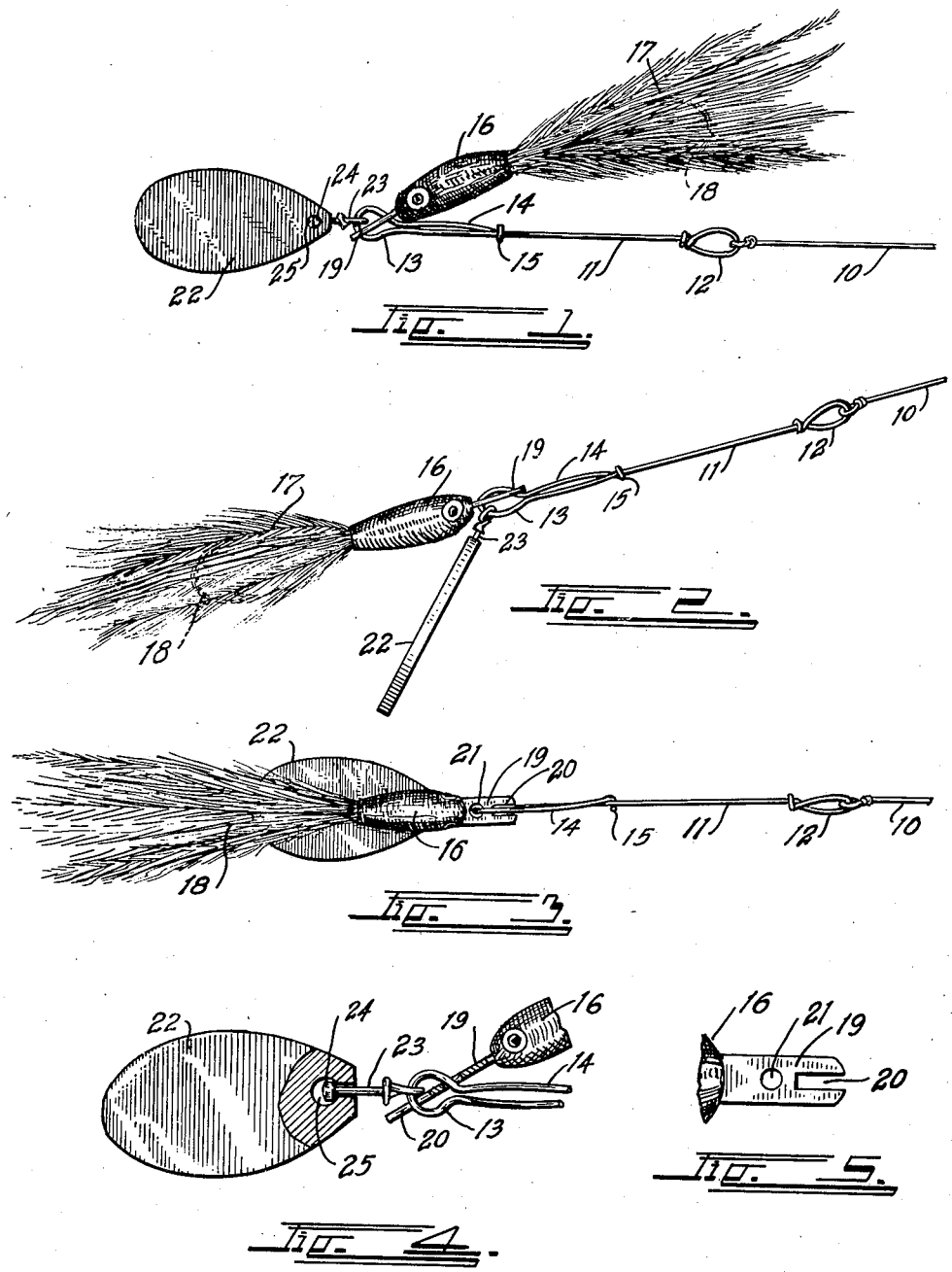
INVENTOR.
HAROLD G. ALLEN.
BY
ATTORNEY.

UNITED STATES PATENT OFFICE 2,262,828

FISH LURE

Harold G. Allen, Denver, Colo.

Application November 5, 1940, Serial No. 364,380

3 Claims. (Cl. 43—42)

This invention relates to a fish lure and means of attaching a fish lure and has for its principal object the provision of means of attaching a fish hook and lure to a wire leader so that the lure and hook can swing freely rearwardly along the leader when a cast is being made and then freely swing to its proper position behind the leader after the cast has been completed without kinking, locking, or turning.

Wire leaders provided with snaps, hook rings, etc. have long been used for attaching fish lures, spinners, weights and the like to fishing lines. They have not been satisfactory, however, due to the fact that the eye of the lure or other attachment cocks, cramps, twists, and locks in the eye of the leader during the cast so that the position of the line after it strikes the water is very uncertain. This attachment is so designed that the lure may swing freely and completely around the eye of the leader but can never become cocked or locked therein and so that it will always assume the same position with reference to the eye of the leader whenever trolled through the water.

Another object of the invention is to provide a combined weight and wabble plate that will act as a weight to give a maximum cast, which will hold the lure in its proper position, and which will give an erratic fluttering motion to the lure in the water.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved lure and attachment means illustrating it in the casting position;

Fig. 2 is a similar view illustrating the lure in the trolling position;

Fig. 3 is a top view thereof; and

Fig. 4 is an enlarged detail section illustrating the method of attaching the lure and wabble plate to the leader.

Fig. 5 is an enlarged detail view of the attachment plate.

A fishing line is indicated in the drawing at 10. A typical wire leader is illustrated at 11 having a line loop 12 at one extremity and a lure loop 13 at the other extremity. The lure loop may be of any desired type, such as a snap or other device by means of which any desired lures or attachments may be placed on the leader. As illustrated, it is of the hooked loop type, that is, a wire arm 14 runs from the loop backwardly along the leader terminating in a hook 15 which engages the leader. By disengaging this hook, the loop 13 can be opened for placing any desired attachments in the lure loop.

As thus far described, the device is standard equipment.

In this invention, a lure, such as illustrated at 16, which may be provided with suitable hackles 17 and hook 18, are attached to the leader. The attachment is accomplished by means of a flat, elongated attachment plate 19 which is imbedded in, or otherwise fixedly secured to, the lure 16. This plate is formed with a notch 20 in its free extremity and with a hole 21 positioned between the notch and the lure.

When in place on the loop 13, the hook 15 and the arm 14 are passed through the hole 21 and the plate is moved down over the loop 13 so that the opposite side of the loop passes through the notch 20. The hook is then again secured to the leader 11.

It can be readily seen that the plate cannot now be rotated about the axis of the leader 11 but can freely swing around the transverse axis of the loop 13 to any position thereon. Therefore, the lure can fall back along the leader, as shown in Fig. 1 to facilitate casting and when drawn through the water will fall back into perfect alignment with the leader at all times without danger of locking or cocking in the loop.

The casting is facilitated by a relatively thick flat ovalescent plate 22. This plate is provided with a rotatable shank 23 which passes through an opening in the extremity of the plate and terminated in a head 24 within a hole 25 passing transversely through the plate. This forms a swivel construction which allows the plate to freely rotate about its shank 23. The thickness of the plate gives it considerable weight so that it makes an ideal casting weight. It also holds the lure in its proper vertical position with the hook 15 downward. It has been found, however, that this plate also produces a very peculiar erratic motion when trolled through the water in the position of Fig. 2. It spins with increasing velocity until a certain speed is reached and then suddenly stops and reverses its direction of spin with increasing velocity until it again reverses. This not only creates a flashy fish attracting effect but also produces a variety of wabbling motions in the line itself.

It will also be noticed that the plate 22 hangs and dangles ahead of the hook 18 so as to prevent the latter from catching weeds, vines, etc. It swings sufficiently clear from the hook, however, due to its weight, so that the strike of the fish is unobstructed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for attaching a fish lure to a leader ring comprising: a relatively flat plate secured to and projecting from said lure; an opening through said plate for the passage of one side of said leader ring; and a notch in the free extremity of said plate for the reception of the other side of said leader ring.

2. A fish lure comprising: a wire leader; a lure loop formed in one extremity of said leader; a relatively heavy wabble plate suspended from and swiveled to said lure loop; a fish lure engaging said lure loop above and to the rear of said plate; and means for preventing relative rotation between said lure and said leader.

3. A fish lure comprising: a wire leader; a lure loop formed in one extremity of said leader; a relatively heavy wabble plate suspended from and swiveled to said lure loop; a fish lure; an attachment plate rigidly projecting from said lure; an opening through the mid-portion of said attachment plate for the passage of one side of said leader ring; and a notch in the free extremity of said attachment plate for the reception of the other side of said leader ring for preventing relative rotation between said lure and said leader.

HAROLD G. ALLEN.